L. A. CHARLES.
PROCESS AND APPARATUS FOR FUEL INJECTION IN INTERNAL COMBUSTION ENGINES.
APPLICATION FILED DEC. 27, 1921.
1,418,232.
Patented May 30, 1922.
6 SHEETS—SHEET 1.
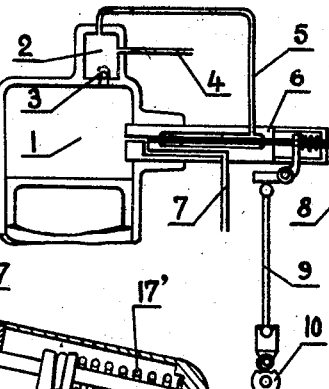
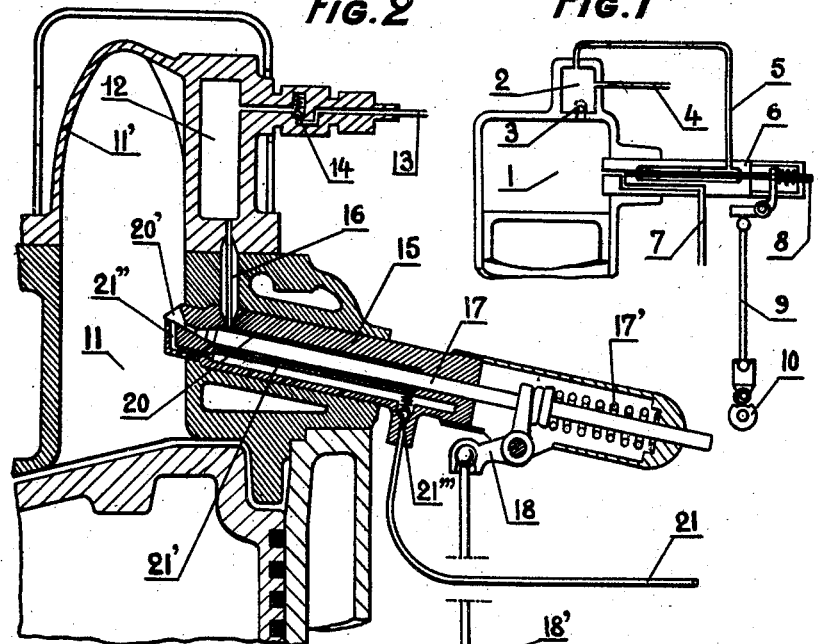
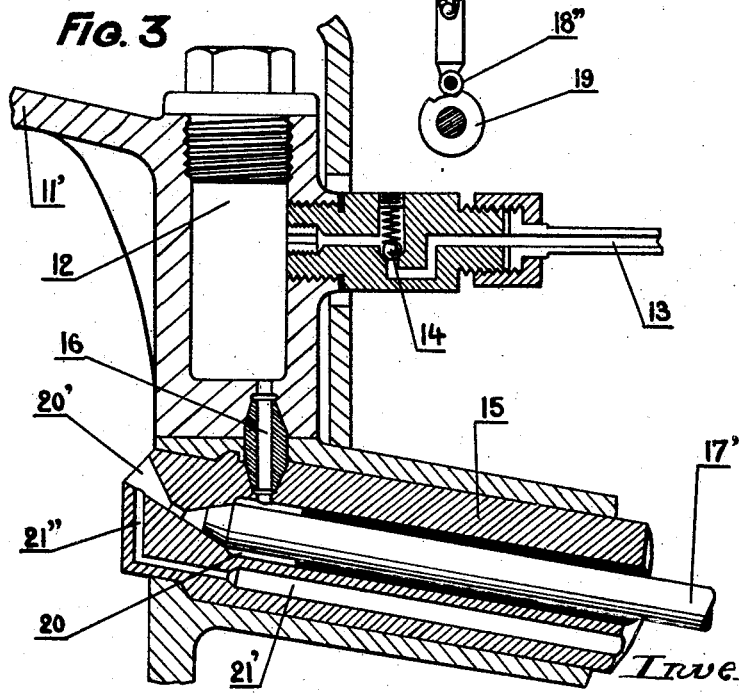
Inventor
L. A. Charles,
By Marks & Clerk
Attys.

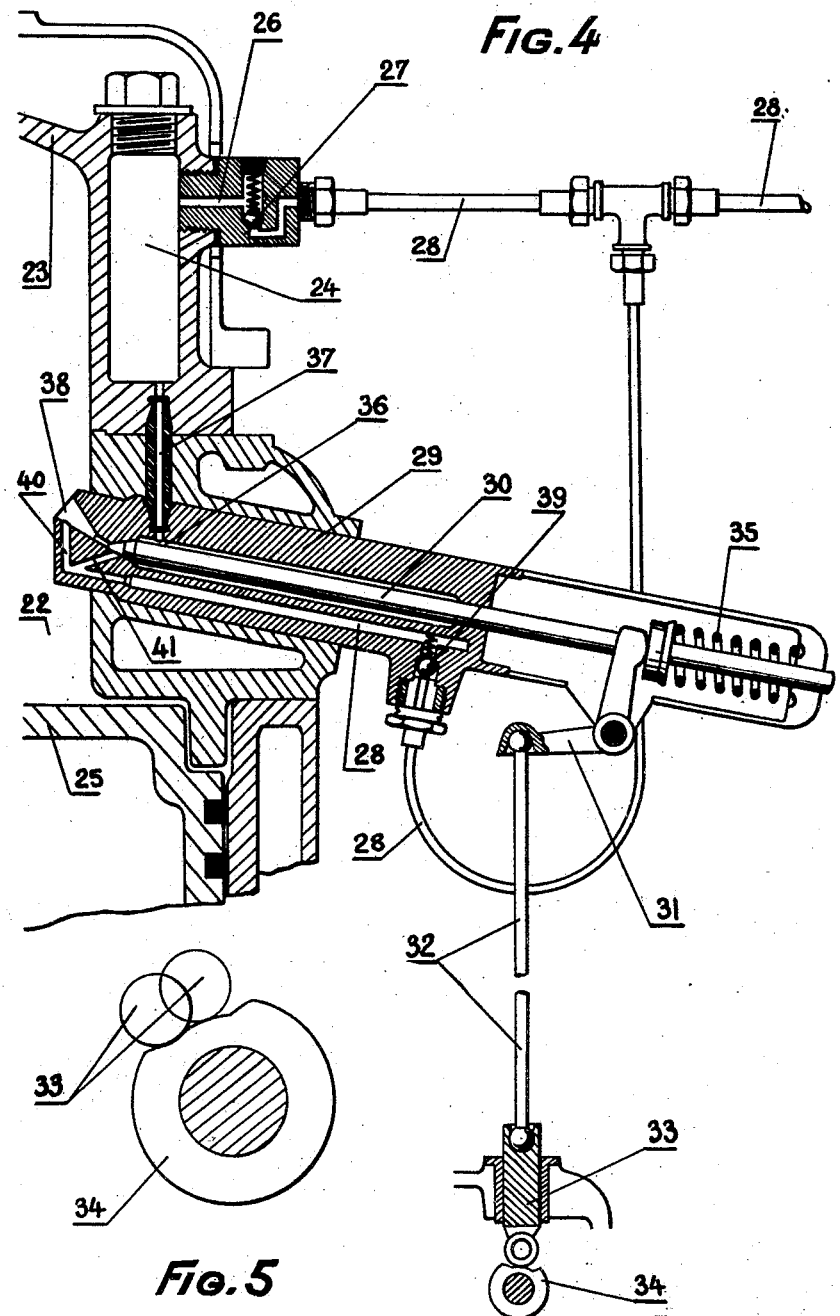

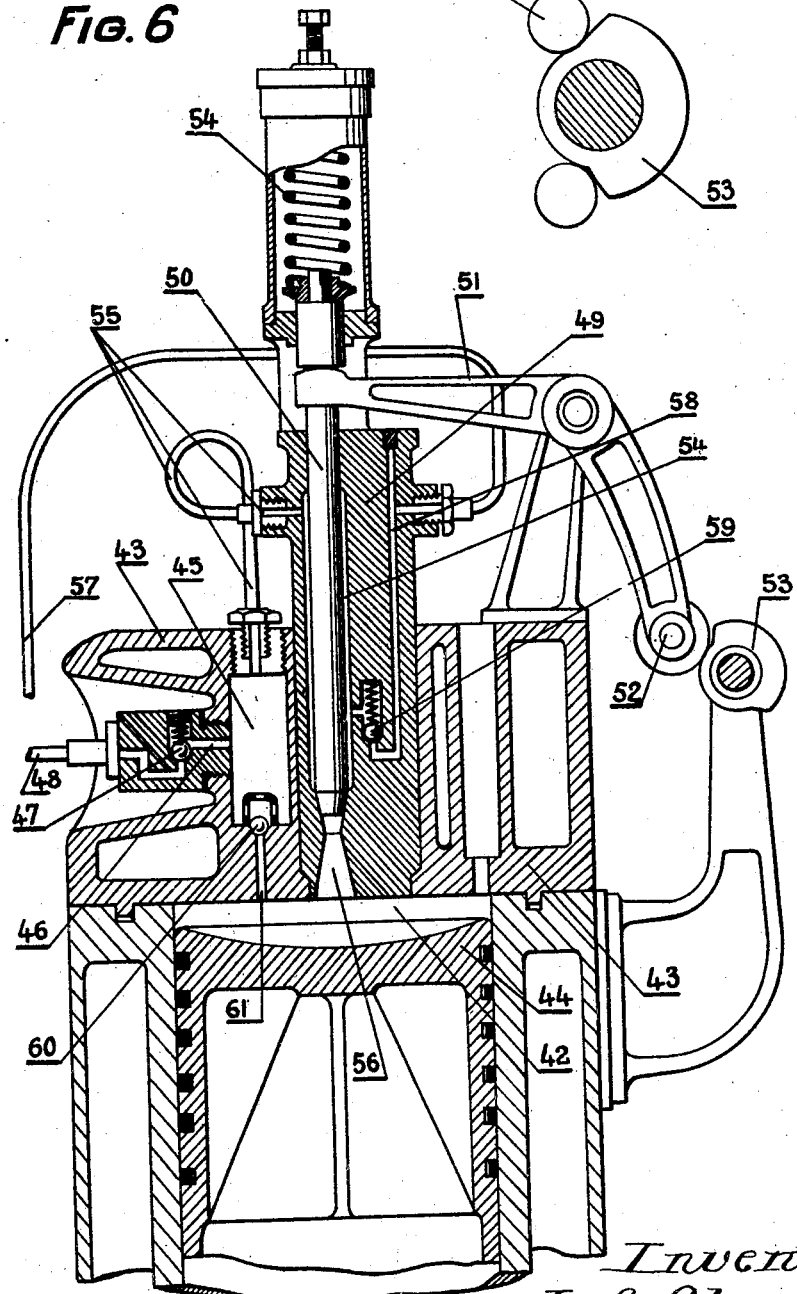
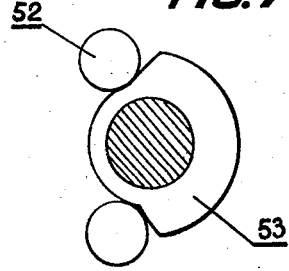

L. A. CHARLES.
PROCESS AND APPARATUS FOR FUEL INJECTION IN INTERNAL COMBUSTION ENGINES.
APPLICATION FILED DEC. 27, 1921.

1,418,232.

Patented May 30, 1922.

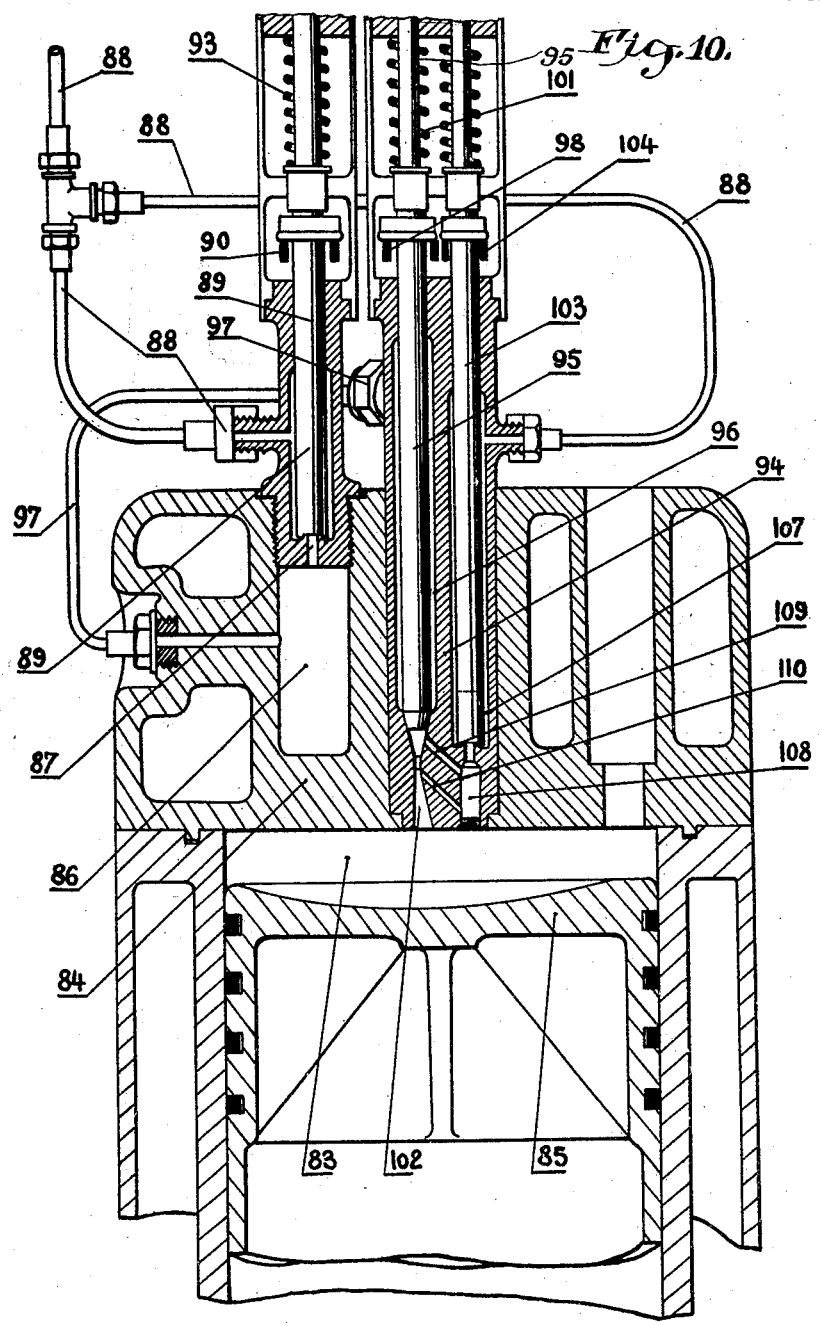

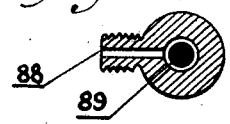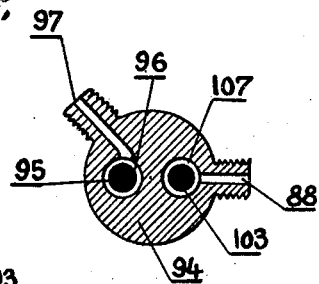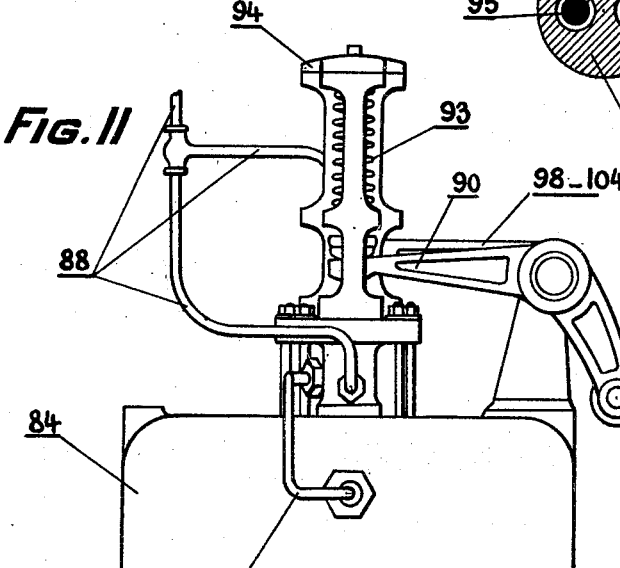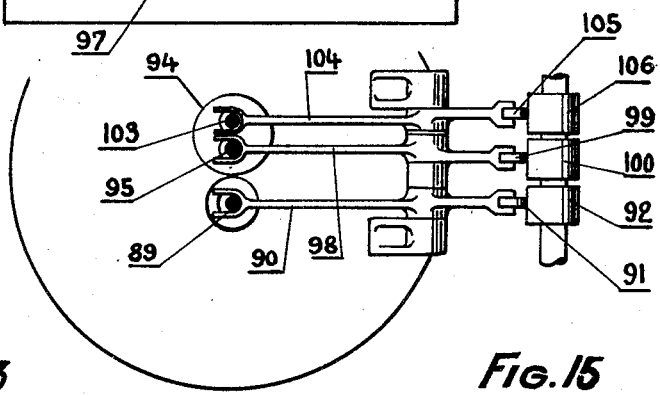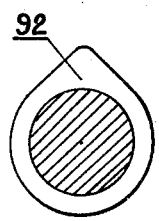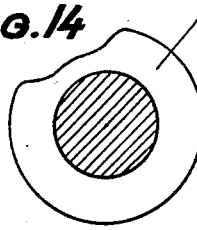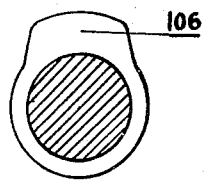

UNITED STATES PATENT OFFICE.

LOUIS AUGUSTE CHARLES, OF PARIS, FRANCE.

PROCESS AND APPARATUS FOR FUEL INJECTION IN INTERNAL-COMBUSTION ENGINES.

1,418,232. Specification of Letters Patent. Patented May 30, 1922.

Application filed December 27, 1921. Serial No. 525,131.

*To all whom it may concern:*

Be it known that I, LOUIS AUGUSTE CHARLES, a citizen of the French Republic, residing at 26 Boulevard Rochechouart, Paris, France, have invented certain new and useful Processes and Apparatus for Fuel Injection in Internal-Combustion Engines, of which the following is a specification.

In internal combustion engines, the introduction of fuel takes place at the end of the compression period, and numerous methods are known and employed for the introduction of fuel, such for instance as: (1) Introduction of liquid fuel by the delivery pressure of a pump. (2) By a current of air under pressure, the air being supplied by a compressor. (3) By a current of gas taken by means of a check valve from an auxiliary container, at the highest pressure prevailing in the preceding action of the gas in the cylinder of the engine (Haselwander method). (4) By means of a pressure exerted upon the fuel, this being obtained by a gas which is compressed by a piston at the moment of introduction (Trinkler method) and the like.

The drawbacks which are to be found in the above-indicated methods may be respectively stated as follows: Case (1) requires considerable delivery pressures in order to obtain a suitable spraying of the fuel. Case (2) requires the use of a compressor, with a consequent expenditure of energy, and the engine is rendered more complex. Case (3) can only be used for engines operating upon explosion cycles. For engines employing constant pressure cycles, or intermediate cycles, the excess of the combustion pressure over the final pressure is not sufficient to enable the use of the same for effecting a suitable introduction of fuel; and furthermore, for engines using explosion cycles, the gas which is collected during a preceding operation will become cooled very rapidly and is hence employed at a pressure much below the maximum pressure. Case (4); the arrangement operates in principle as a compressor and is subject to the drawbacks inherent in this latter.

The method according to the present invention consists in employing, for the introduction and spraying of fuel in the engine cylinder at the end of the compression period, hot gas in the compressed state which is supplied by the preceding explosion and is stored in a small container adapted to communicate in an intermittent manner with the cylinder (before or after the explosion), and having added thereto a suitable amount of fuel; the explosion of this carburetted mixture is produced at the exactly proper time, before the injection of the fuel, in order that the explosion pressure of the said mixture shall attain the maximum value.

In these conditions, the said invention is to be carried into effect by the combination of the following mechanical parts and dispositions: a container for gas of injection having determined dimensions and so connected with the compression chamber of the engine cylinder that the said container shall at the end of the compression period be filled with air at the same pressure as in the engine cylinder;—a closing device either independent, or, dependent upon the device used for the injection of fuel into the cylinder, and acting at the end of the compression to close the communication between the said container of gas of injection and the cylinder;—a pump or an injector for introducing into the said gas container, immediately after the closing of the said closing device, a suitable quantity of fuel which becomes spontaneously inflamed either by the temperature of compression or by the presence of a heated wall, and burns according to the required operating conditions of the explosion;—an injector for the cylinder feed, which is supplied with fuel either directly from a tank under pressure or by a pump, in constant connection with the said container, adapted to introduce the fuel into the compression chamber of the engine cylinder and to effect the spraying of the fuel therein, by means of hot gas under pressure contained in the said container;—controlling means for the needle used for cylinder injection for regulating the duration of the injection and maintaining communication between the container of injection gas and the cylinder during the exhaust period of the cylinder cycles, the said needle acting as a closing device for the said gas container as above mentioned, and to this effect it will remain open from the start of the injection, until the end of the following compression period.

The said method will thus afford in the compression chamber of the engine a spraying of the fuel by means of gas at high temperature and pressure, these being excellent conditions for obtaining the complete combustion of heavy fuel products such as heavy mineral oils, tar oil, schist oil, and the like. The said method possesses the following advantages over known methods. It does not require the use of pumps operating at high pressure; it does not require a compressor, either separate as in the usual Diesel engines, or combined with the injector for instance as in the Trinkler method; it is applicable to engines operated on explosion cycles, or constant pressure cycles, or by the combination method (on the contrary to the Haselwander method); it makes use of highly heated gas for the injection, thereby considerably facilitating the burning of heavy fuel, and the energy supplied by the fuel burned in the injection gas container is recovered in the compressed gas introduced into the engine cylinder before the expansion period.

The following description, together with the accompanying drawings which are given by way of example, sets forth a general embodiment of the invention and various forms of construction relative to different types of engines.

Fig. 1 is a general diagrammatic view of the invention.

Figure 2 is a form of the entire apparatus shown applied to the cylinder of an internal combustion engine, a portion of the latter being also shown.

Fig. 3 is a portion of the apparatus illustrated in Figure 2 shown on a larger scale.

Fig. 4 is a view similar to Figure 2 of a modification of the apparatus.

Fig. 5 is an enlarged detail of the type of cam forming part of the controlling mechanism for the closing device shown in Figure 4.

Figure 6 is a view similar to Figure 2 showing a further modification of the invention.

Figure 7 is an enlarged detail of the type of cam used in connection with the apparatus shown in Figure 6.

Figure 10 is a section of a still further modified form of the invention.

Figures 8, 9:
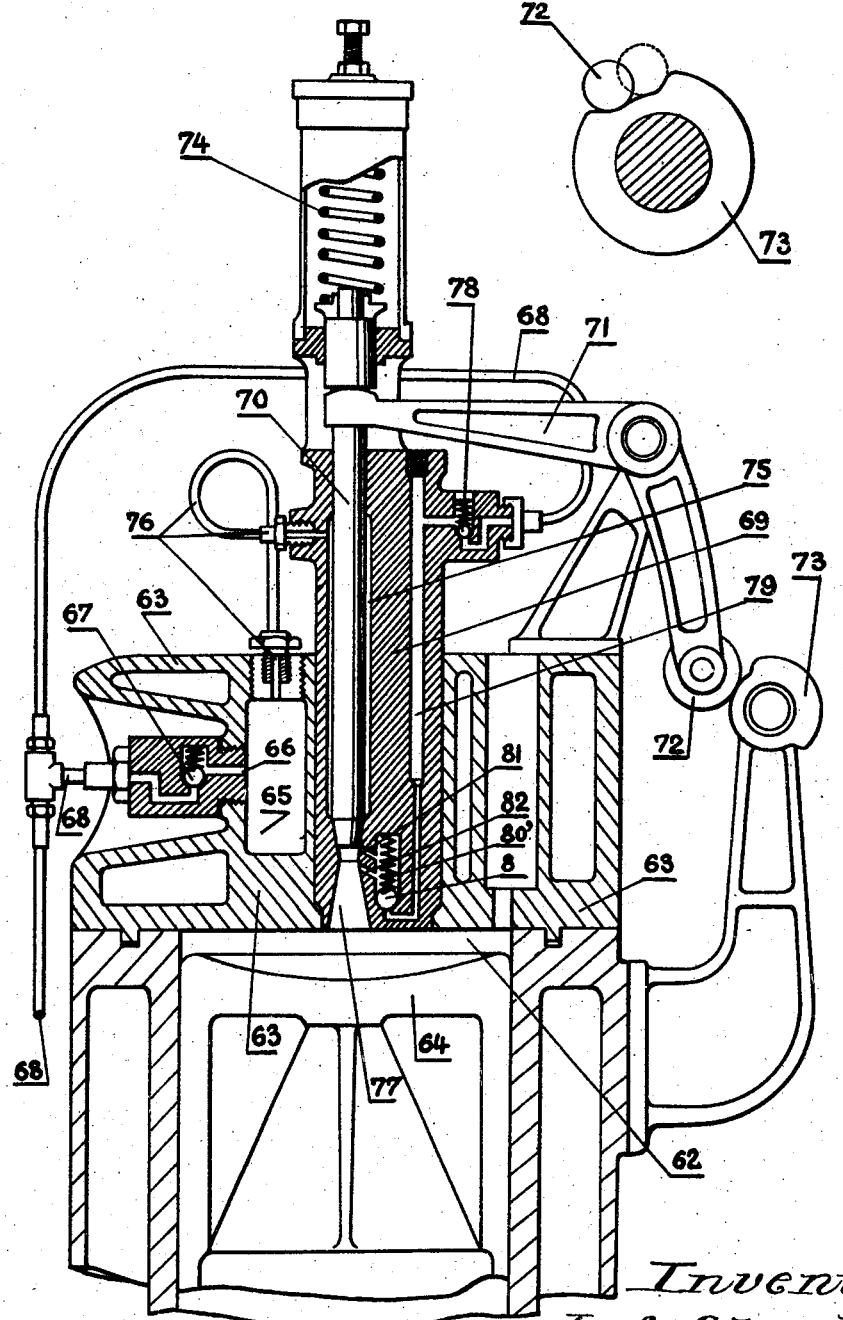
Figure 8 is a sectional view of a further modification of the apparatus.
Figure 9 is a detail of the cam used in connection with the form of the invention shown in Figure 8.

Figure 10ª is a transverse section through the control needle for the fuel to the container for the type of apparatus shown in Figure 10.

Figure 10ᵇ is a transverse section through the upper part of the injector of the form of the invention shown in Figure 10.

Figure 11 is a side elevation of the apparatus shown in Figure 10 taken at right angles to the latter.

Figure 12 is a horizontal section of the apparatus shown in Figure 1 illustrating the arrangement of the levers for actuating the several needles.

Figures 13, 14 and 15 are enlarged detail views of the cams for controlling the needles of the apparatus shown in Figure 10.

In Fig. 1, 1 indicates the compression chamber of the engine, 2 the container for the gas employed for injection, 3 the automatic closing device, for instance a check valve formed by a ball, 4 a pipe connecting with a pump or injector for the supply of fuel to the container 2 at the end of the compression stroke, 5 a tube connecting the container 2 with the injector 6 of the engine, 6 the injector of the engine, 7 a pipe for fuel feed to the injector 6, 8 the needle of the injector 6, 9 the control device for the needle 8, 10 the cam for the control of the needle 8.

The said device is operated in the following manner: During the compression period of the engine, the check valve 3 is lifted and the container 2 is filled with air at the same pressure as the engine cylinder 1. At the end of the compression stroke the container 2 is supplied through 4 with the requisite amount of fuel which is spontaneously inflamed and is burned according to the explosion method; the check valve is automatically closed; when the pressure reaches a maximum in the container 2, the needle 8 is removed from its seat by the control device 9 and the cam 10 and effects the discharge into the cylinder (through the pipe 5) of the gas in the heated and compressed state from the container 2. At the same time the injector pump delivers the requisite amount of fuel through the pipe 7. Upon leaving the latter pipe, the fuel is projected and sprayed in the cylinder by the current of hot gas proceeding from the injector. The needle 8 remains in the raised position from the beginning of the injection to the end of the exhaust stroke, in order to effect, subsequently to the injection, the discharge of the gas from the container 2 during the expansion of the products of combustion in the compression chamber 1 and the subsequent emptying of the container, during the exhaust. The cam 10 is given a suitable profile in order to provide for the lift of the needle 8 in this manner. The combustion in the cylinder 1 takes place according to conditions of constant explosion or constant pressure, or intermediate conditions according to the delivery of the injector as concerns to injected gas or to fuel. The ignition of this fuel in the compression chamber of the engine takes place by the heated walls or by the temperature of compression, that is, according to the methods employed in engines wherein the admission of fuel takes place at the end of the compression stroke.

Figs. 2 and 3 relate to a form of construction applicable to an engine wherein the ignition of the fuel is carried out by the action of the heated walls, this type of engine being usually designated as semi-Diesel.

In this arrangement of engine, a pump feeds the injection container and a second pump feeds the injector. The closing device affording the connection between the power cylinder and the said container is constituted by the needle of the injector. In the figures, 11 indicates the cylinder head of the engine, 11' the heated wall of the compression chamber, which is heated at the start and is retained in heated condition while the engine is running, 12 the injection container 13 the duct for the fuel injection into the container 12, 14 a ball serving as a check valve disposed between the member 4 and the pump, 15 the injector delivering fuel to the engine, 16 a pipe connecting the chamber of the injector 15 with the container 12, 17 the needle of the injector which is controlled by the tappet 18 actuated by the rod 18' raised by the roller 18" which is controlled by the cam 19. The needle 17 is returned upon its seat by the spring 17'; 20 indicates the chamber of the needle, 20' the duct for the outlet of gas from the injection container 12'. At 21 is the admission of fuel from the pump of the injector 15, 21' is a duct conducting the fuel in the injector to the orifice 21"; at 21'" is a ball check valve mounted in the passage 21'.

The said apparatus is operated in the following manner: During the compression stroke the needle 17 is lifted by the cam 19, and the compression takes place in the injection container 12; at the end of the compression stroke the needle valve is closed and the injector 13 introduces the requisite amount of fuel into the container 12, directing the fuel upon the wall of the said container which is common to the combustion chamber of the engine 11 and is not cooled. The combustion takes place in the container 12 according to explosion conditions; after a very short time, when the pressure is a maximum in the container 12, the needle 17 is lifted by the cam 19 and at the same time the injector pump 15 delivers the fuel through the orifice 21"; the gas from the container 12 is discharged through the aperture 20' and atomizes the fuel admitted through the duct 21", directing the same upon the heated wall 11 where it becomes inflamed and is burned according to the required conditions with constant explosion or constant pressure, or intermediate operating conditions according as the pump of the injector 15 delivers its fuel supply instantaneously or in a longer time.

The needle 17 remains open during the expansion, and the hot gases leave the container 12; at the end of the exhaust period there will remain in the container 12 a quantity of burnt gas at the same pressure as in the power cylinder. During the compression stroke, the fresh air which is mixed with the residual gas will be compressed in the container 12 and the series of operations will recommence. The needle 17 will remain open from the beginning of the injection to the end of the following compression period. This result is obtained by the profile given to the cam 19, Fig. 2.

Figs. 4 and 5 show the same arrangement as the preceding, and applicable to the same class of engines, but with this difference that a single pump is used for the supply of fuel to the injection container and to the injector. The delivery of the said pump occurs at the moment when the injection is to take place in the container 24, and the fuel to be used in the engine remains collected in the ducts 40 and 41 situated at the end of the injection duct; the duct 41 is used in addition to the devices comprised in the preceding arrangement; at the moment of the injection, the hot gases are delivered through 38 and the pressure of the gas is exerted in 41 and expels the fuel through 40; the fuel is atomized by the current of gas delivered through 38. According to the diameter of the duct 40, the fuel is supplied instantly or slowly, this corresponding to various operating conditions of combustion for the cycles obtained in the engines. For all dispositions which are not repeated, the same arrangement and operation prevails as in the preceding case.

Figs. 6 and 7 relate to an embodiment of the invention applicable to an engine wherein the fuel ignition is effected by the temperature of compression (engine of the Diesel type).

In this form of construction, the injection container is supplied with fuel by means of a pump, and the injector of the engine is supplied by means of a second pump; the closing device which makes connection between the engine cylinder and the injection container is constituted by the needle of the injector.

In these figures 42 is the compression chamber of the engine, 43 the cylinder head, 44 the piston, 45 the injection container, 46 the injector for the same, 47 the check valve of the injector, 46, 48 the pipe connecting the injector 46 with the fuel pump of the same, 49 the engine injector, 50 the injector needle, 51 the tappet for actuating the needle 50, 52 the roller for 51, 53 the control cam for the needle, 54 the annular chamber of the needle which is in constant connection through the pipe 55 with the injection container 45, 56 the discharge duct of the fuel and the injected gases into the cylinder, 57 the pipe connecting the second fuel pump with the engine injector, 58 the duct for the descent of the fuel into the annular chamber of the needle 50 of the injector, 59 a check valve disposed in the fuel passage, 60 the check valve forming an automatic closing device between the injection container 45 and the cylinder, 61 the connecting duct which is opened or closed by the device 60.

The operation of the said arrangement is as follows:

During the compression stroke the ball 60 is automatically raised and at the end of the compression period the container 45 is filled with residual gas and fresh air at the same pressure as in the cylinder; the injector 46 delivers into the container 45 the requisite amount of fuel to obtain the combustion of the mixture according to the conditions stipulated for the explosion; the ball 60 then automatically closes the aperture 61. When the pressure has reached the maximum value in the injection container 45, the needle 50 of the injector 49 is raised by the cam 53 and the fuel which had been admitted through the duct 58 into the annular chamber 54 is driven into the engine cylinder by the gas from the container 45 flowing through the piping 55 into the chamber 54 above the fuel; the latter is burned in the cylinder according to the required operating conditions at constant pressure or according to any suitable operating conditions applicable to internal combustion engines. The output afforded by the needle and the aperture 56 (whose form is determined in order to secure the best conditions of flow) will regulate the duration of the period of fuel admission. As in all engines, the quantity of fuel will be caused to vary with the load under the action of any suitable governing means. After the injection has taken place, the expansion is effected in the engine cylinder; the needle 50 remains lifted during the periods of expansion and exhaust; the gas remaining in the injection container 45 after the injection will participate in the expansion, and during the exhaust period will evacuate the container 45. During the admission period the injector 49 is closed and the fuel pump will fill the annular fuel chamber 54 without requiring a high delivery pressure, since the pressure in 54 is near the atmospheric pressure; then the compression takes place and the series of operations recommences. All the foregoing considerations as regards the said form of construction are equally applicable to a 4-cycle or a 2-cycle operation.

Figs. 8 and 9 show the same arrangement as the preceding, applied to the same type of engine, but with the difference that a single pump is used for the fuel supply of the injection container 65 and the cylinder injector 69. The delivery of the said pump takes place (at the moment of injection) in the container 65, and the fuel required for the engine remains stored in the chamber 80' which is connected by the two ducts 81, 82 with the inlet and with the narrow part of the injection aperture which has a converging-diverging form. At the moment of the injection, the pressure of the hot gas in 65 will be brought to bear through the duct 81 upon the upper surface of the fuel in the chamber 80' concurrently with the flow of gas in the duct 77; the lower portion of the fuel in the chamber 80' communicates with 77 through the duct 82 in a region wherein the pressure is less than at the entrance of the duct 81. The difference of pressure exerted at the top and bottom of the fuel will cause the latter to flow out through 82 into 77, at which point it is sprayed and introduced into the cylinder. According to the diameter of 77 and 82, the duration of this fuel introduction will be caused to vary, thereby providing for cylinder combustion according to different required operating conditions. Connection between the injection container 65 and the engine is afforded by the needle 70 of the injector 69; this needle will remain lifted from the beginning of the injection to the end of the following compression period. For all the remaining portions of this device, the same arrangement and operation prevail as for the preceding device.

Figs. 10 to 15 relate to a form of construction of the invention as applied to a Diesel engine. It differs from the two preceding cases from the fact that the fuel feed is effected without the use of a pump both for the container and the injector of the engine. This latter is of the type patented in France by the applicant under No. 497,092 March 15, 1919.

It should be repeated that this type of injector, Fig. 10, comprises a needle 95 disposed in the duct 96 used for the admission of air for the injection and whereof the end 102 has a converging-diverging form, and a needle 103 disposed in the duct 107 used for the admission of fuel; the fuel which is allowed to flow by the needle 103 when raised will proceed into the storage chamber 108 connected by two ducts, an upper duct 109 and a lower duct 110, with the said converging-diverging air duct, and in this manner when the air injection needle is raised, the fuel will be projected into the current of air under the effect of the difference of pressure prevailing in the converging-diverging parts adjacent the openings of the ducts 109 and 110.

In the form of construction of the invention which is here set forth, the fuel feed to the injection container 86 is afforded by the needle 89 which allows the requisite amount of fuel to flow into the said container. The fuel is at a pressure of a few grammes above this needle 89. The latter is controlled, Fig. 12, by the lever 90 whereof the roller 91 is caused to bear upon the cam 92 having a suitable profile, Fig. 13. The fuel is delivered into the injection container 86 during the period of admission of air into the engine, and it becomes automatically inflamed when the compression temperature rises to a sufficient point. Connection between the container 86 and the engine cylinder is carried out through the injector 94 of the cylinder and the pipe 97. The engine injection needle 95 is raised by the suitably shaped cam 100, Fig. 12, from the beginning of the injection to the end of the compression, before the charge becomes ignited in the injection container 86. The injector 94 is supplied with fuel from a suitable tank which is maintained at a pressure of a few grammes, at a period wherein the cylinder pressure is adjacent the atmospheric pressure (period of air admission). The control of the fuel admission needle 103 is effected by the suitably shaped cam 106, Fig. 15. The cams 100 and 106 have a variable profile and the cam shaft is movable in the lengthwise sense for regulating purposes, as indicated in the French Patent 497,092.

The injection needle 95 constitutes the closing device between the injection container 86 and the cylinder; the said needle which is raised from the beginning of the injection to the end of the compression as above stated will permit the injection container, after the injection, to participate in the expansion, to evacuate the burnt gas therefrom during the exhaust period, and to become filled with air during the compression period.

By reason of the application of the said form of construction to Diesel engines, the injection compressor and the fuel pumps may be eliminated in these engines.

Having now particularly described and ascertained the nature of my said invention and in what manner the same is to be performed, I declare that what I claim is:

1. In an apparatus of the character described, an internal combustion engine including a compression chamber, an injection gas container, an injector connected with the compression chamber and container, said container being adapted, at the end of the compression period of the engine, to contain air at the same density as the compression chamber, a closing device associated with the injector, means for introducing the fuel into said container immediately after the closing of said closing device, controlling means for the closing device whereby open communication between the container and compression chamber is maintained during the exhaust period of the engine, and fuel supply means for the injector, said injector being adapted to introduce into and effect spraying of the fuel in the compression chamber by means of hot gas under pressure from the container incident to the opening of the closing device, said controlling means maintaining the closing device in open position from the beginning of the introduction of fuel into the compression chamber until the end of the following compression period of the engine and acting at the end of the compression period to close communication between the compression chamber and the container.

2. An apparatus as claimed in claim 1 characterized by the provision of a pressure feed device for feeding fuel to the injection gas container and the provision of a pressure feed device for feeding fuel to the injector.

3. In an apparatus of the character described, an internal combustion engine including a compression chamber and a container, an injector connected with the compression chamber and container and having a fuel conducting passage therein, said container being adapted, at the end of the compression period of the engine, to contain air at the same density as the compression chamber, a needle valve arranged in the injector for closing communication between the compression chamber and the container, means for introducing fuel into said container immediately after the closing of the valve, controlling means for the valve whereby open communication between the container and compression chamber is maintained during the exhaust period of the engine, and fuel supply means connected with the fuel passage, said injector being adapted to introduce into and effect spraying of the fuel in the compression chamber by means of hot gas under pressure from the container incident to the opening of the valve, said controlling means maintaining the valve in open position from the beginning of the introduction of fuel into the compression chamber until the end of the following compression period of the engine and acting at the end of the compression period to close communication between the compression chamber and the container.

4. In an apparatus of the character described, an internal combustion engine including a compression chamber, an injection gas container having an internal chamber communicating with the compression chamber, means connecting the container with the injector chamber, said container being adapted at the end of the compression period of the engine to contain air at the same density as the compression chamber, a valve mounted in the injector container, said injector having a fuel passage also communicating with the compression chamber, means for introducing fuel into said container immediately after the closing of the valve, controlling means for the valve whereby open communication between the container and compression chamber is maintained during the exhaust period of the engine, and fuel supply means connected with the fuel passage in the injector, said injector being adapted to introduce into and effect spraying of the fuel in the compression chamber by means of the hot gas under pressure from the container incident to the opening of the valve, said controlling means maintaining the valve in open position from the beginning of the introduction of fuel into the compression chamber until the end of the following compression period of the engine and acting at the end of the compression period to close communication between the compression chamber and the container.

In witness whereof I have hereunto set my hand.

LOUIS AUGUSTE CHARLES.